US005703952A

United States Patent [19]
Taylor

[11] Patent Number: 5,703,952
[45] Date of Patent: Dec. 30, 1997

[54] METHOD AND APPARATUS FOR GENERATING A CIPHER STREAM

[75] Inventor: Richard Taylor, Sherbrooke, Australia

[73] Assignee: Telstra Corporation Limited, Melbourne, Australia

[21] Appl. No.: 448,420

[22] PCT Filed: Dec. 30, 1993

[86] PCT No.: PCT/AU93/00687
   § 371 Date: Jun. 2, 1995
   § 102(e) Date: Jun. 2, 1995

[87] PCT Pub. No.: WO94/16509
   PCT Pub. Date: Jul. 21, 1994

[30] Foreign Application Priority Data

Dec. 30, 1992 [AU] Australia ............. PL 6577/92

[51] Int. Cl.$^6$ .................................. H04L 9/00
[52] U.S. Cl. ................ 380/44; 380/43; 380/47
[58] Field of Search ................. 380/43, 44, 47

[56] References Cited

U.S. PATENT DOCUMENTS

| | | | |
|---|---|---|---|
| 4,145,568 | 3/1979 | Ehrat | 380/47 |
| 4,145,569 | 3/1979 | Ehrat | 380/47 |
| 4,860,353 | 8/1989 | Brown | 380/44 |

FOREIGN PATENT DOCUMENTS

| | | |
|---|---|---|
| 62-281537 | 12/1987 | Japan . |
| 63-308432 | 12/1988 | Japan . |

OTHER PUBLICATIONS

Golic, "Correlation via linear sequential circuit approximation of combiners with memory," Eurocrypt '92, Extended Abstracts (1992).

Lai et al., "A Fast Cryptographic Checksum Algorithm Based on Stream Ciphers," Auscrypt '92 Abstracts (1992).

Meier and Staffelbach, "Nonlinearity criteria for cryptographic functions," Proceedings of Eurocrypt '89 (1989).

Meier and Staffelbach, "Fast Correlation Attacks on Certain Stream Ciphers," *Journal of Cryptology*, vol. 1, 159–176 (1989).

Meier and Staffelbach, "Correlation Properties of Combiners with Memory in Stream Ciphers," *Journal of Cryptology*, vol. 5, 67–86 (1992).

Rueppel, "Analysis and Design of Stream Ciphers," *Communications and Control Engineering Series*, Eds. Fettweis et al., Springer–Verlag (1986).

Siegenthaler, "Correlation–immunity of nonlinear combining functions for cryptographic applications," *IEEE Transactions on Information Theory*, vol. 30, No. 5, 776–780 (1984).

Staffelbach and Meier, "Cryptographic Significance of the Carry for Ciphers Based on Integer Addition," Proceedings of Crypto '90 (1990).

*Primary Examiner*—Salvatore Cangialosi
*Attorney, Agent, or Firm*—Thomas J. Engellenner; Anthony A. Laurentano; Lahive & Cockfield,LLP

[57] ABSTRACT

A system for encrypting or decrypting a digital message comprising a linear driving subsystem (4) for generating a pseudo random data sequence, a non-linear feedback subsystem (6) for producing a cipher stream from said pseudo, random data sequence, and an encryption processor (26) for encrypting or decrypting a message by combining it with said cipher stream, the non-linear feedback subsystem comprising a non-linear feedback processing means (10) for generating a feedback sequence (12) by applying a non-linear function to at least one value from said pseudo-random data sequence and at least one previous value of the feedback sequence, and a cipher stream generating means (10) for generating said cipher stream by summing products of pairs of values of said pseudo random data sequence together with a value from said feedback sequence, the pairs of values being chosen such that the difference in sequence position as between each member of a pair is different as between each pair.

33 Claims, 3 Drawing Sheets

METHOD AND APPARATUS FOR GENERATING A CIPHER STREAM

This invention relates a method and apparatus for generating a cipher stream. Embodiments of the invention may find use in enciphering or encrypting of digital messages, such as in telecommunications and computer communications systems.

In digital communication systems, such as broadband integrated systems digital networks (B-ISDN) it is often advantageous for digital messages transmitted thereon to be encrypted or enciphered such that a person intercepting the message is unable to ascertain its meaning. Therefore, at the sending site on the network a plain text message is, under control of an enciphering key, transformed into cipher text which is preferably unintelligible to anyone not having the secret deciphering key. At the legitimate receiving site on the network, the cipher text, is under control of the secret deciphering key, retransformed into the original plain text message. Cryptographic systems which operate in this way are commonly classified into block ciphers and stream ciphers.

Stream ciphers act by dividing the plain text into characters, each of which is enciphered utilising a time varying function whose time dependency is governed by the internal state of the stream cipher. The time varying function is produced by a key stream generator, which generates a digital cipher stream in accordance with key data which is kept secret. The key stream generator is constructed such that the cipher stream produced is a pseudo random bit stream which is cyclic, but has a period which is much greater than the length of key data provided. In a stream cipher, after each character that is enciphered, the device changes state according to a rule, such that two occurrences of the same character in the plain text message will usually not result in the same cipher text character.

The design of stream ciphers, and the criteria for their effective implementation is well documented, and may be found for example in:

H. Beker and F. Piper, *Cipher systems—The Protection of Communications*, Northwood Book, London, 1982;

R. A. Rueppel, *Analysis and design of stream ciphers*, Springer-Verlag, Berlin, 1986;

W. Meier and O. Staffelbach, Nonlinearity criteria for cryptographic functions, *Advances in Cryptology—Eurocrypt '89, Proceedings*, Springer-Verlag, 549–562.

In summary, the security of a stream cipher depends on the "randomness" of the output cipher key stream. Assuming an interceptor (cryptoanalyst) has knowledge of the plaintext message, the cryptoanalyst may therefore have full access to the runing key stream. For the system to be secure, the cipher stream must be unpredictable: regardless of the number of cipher stream digits observed, the subsequent cipher stream digits must be no better predictable than by just randomly guessing them. This implies that it is unfeasible for the cryptanalyst to determine the true key as he would be able to reliably predict the cipher stream. A necessary requirement for unpredictability is a long period of the cipher stream. The period defines a linear recursion, thus knowing the value of the period and the first period of the cipher stream determines completely the remainder of the cipher stream. Finding the shortest non-linear feedback shift register able to produce a given sequence is in general a difficult task, however algorithms or methods do exist for doing so. Consequently, for the cipher stream to be unpredictable, it is necessary that its linear complexity (which is the length of the shortest linear feedback shift register able to produce the cipher stream) also be large. Unpredictability also requires that, independent of the preceding digit, the next key cipher digit appears to be drawn from a uniform distribution. Therefore the cipher stream necessarily must have uniform statistics, i.e. an equal distribution of single digits, of pairs, triples of digits, etc.

Finally, it is generally preferable that even with a large linear complexity the cipher stream not be even close to any predictable linear forms, i.e. the cipher stream should not be correlated to any linear form. Additionally, a factor which is not often considered in relation to stream ciphers is that of integrity of the cipher text. A message authentication code (MAC), determined from the content of the plain text message, is often transmitted with the cipher text to enable the receiver to determine whether the received deciphered plain text corresponds with the plain text originally transmitted, i.e. whether the cipher text has been altered during transmission. However, in certain cryptographic systems it may be possible for a cryptoanalyst to alter both the cipher text message and the enciphered MAC in such a way that the change is not apparent to the receiver, even though the cryptoanalyst is unable to determine the meaning of the cipher text which has been altered. Therefore, it is also advantageous for cryptographic systems to provide integrity checking which prevents such alterations during transmission from taking place without detection.

In accordance with the present invention there is provided a digital data stream generator for generating a cipher stream, comprising a feedback shift register structure for producing at least one pseudo-random data stream, and a processing structure for producing a cipher stream from said at least one data stream, comprising a means which stores a sequence of combination values derived from a number of preceding values of the at least one data stream, and processing means for producing said cipher stream by multiplying pairs of said combination values and summing said multiplied pairs, wherein the difference in sequence position between the combination values for each pair is different.

The invention also provides a digital data stream generator for generating a cipher stream comprising at least one linear feedback shift register (LFSR), a summing means for producing a sequence of sums of the outputs of said at least one LFSR, a non-linear feedback processing means for producing a sequence of non-linear values in accordance with the outputs of said at least one LFSR and at least one previous value of said non-linear output value sequence, and an output processing means for generating a data stream in accordance with a Bent function utilising a plurality of pairs of said sequence of sums and at least one of said sequence of non-linear values, wherein the difference in the sequence position of the members of each pair is different as between each pair.

The invention also provides a system for encrypting or decrypting a digital message comprising a linear driving sub-system for generating a pseudo random data sequence, a non-linear feedback sub-system for producing a cipher stream from said pseudo random data sequence, and an encryption processor for encrypting or decrypting a message by combining it with said cipher stream, the non-linear feedback subsystem comprising a non-linear feedback processing means for generating a feedback sequence by applying a non-linear function to at least one value front said pseudo-random data sequence and at least one previous value of the feedback sequence, and a cipher stream generating means for generating said cipher stream by summing products of pairs of values of said pseudo random data sequence together with a value from said feedback sequence, the pairs of values being chosen such that the difference in sequence position as between each member of a pair is different as between each pair.

The invention also provides a method for generating a cipher stream comprising generating a pseudo random data stream sequence, and generating a cipher stream by summing products of pairs of values of said data stream sequence with a value derived from a non-linear feedback function of values from the data stream sequence, the pairs of values being chosen such that the difference in sequence position as between each member of a pair is different as between each pair.

The invention further provides a method of encrypting or decrypting a digital message comprising generating a pseudo random data stream sequence, performing a non-linear feed back transformation on said data stream sequence, generating a cipher stream in which correlations to linear forms are minimised by summing products of pairs of values of said data stream sequence with a value of said non-linear feedback transformation, the pairs of values being chosen such that the difference in sequence position as between each member of a pair is different as between each pair, and encrypting or decrypting the message on the basis of said cipher stream.

Preferably said pseudo random data stream or bit stream sequence is produced by a combination of outputs from a plurality of linear feedback shift registers.

Preferably, values of said non-linear feedback transformations are combined with the digital message, and an integrity function applied to the combination to produce an integrity check value (ICV). Preferably the integrity check value is appended to the digital message and encrypted therewith.

A method of generating a cipher stream comprising generating a pseudo random number stream sequence $m_j$, generating a number stream sequence $s_j$ in accordance with a non-linear feedback scheme, and generating an output cipher stream sequence $z_j$ according to:

$$z_j = \sum_{d}^{k=c} m_{a_k} m_{b_k} + s_d$$

where c, d are predetermined integers with $c < d \leq j$ and $a_k$, $b_k$, are integers $\leq j$ such that $(a_e - b_e) \neq (a_f - b_f)$ for all e, f ∈ [c,d].

A stream cipher comprising a linear driving system which in use generates at least one pseudo random data stream, a non-linear combining system including a feed-back data stream, which generates a cipher stream by performing a non-linear operation on said at least one pseudo random data stream, an integrity system which in use combines a digital message with said feed-back data stream and applies an integrity function thereto so as to generate an integrity check value, and an output system wherein the integrity check value is appended to said digital message and the message and appended check value is enciphered by use of said cipher stream.

A preferred embodiment of the invention is described in detail hereinafter, by way of example only, with reference to the accompanying drawings wherein.

Figure 1:
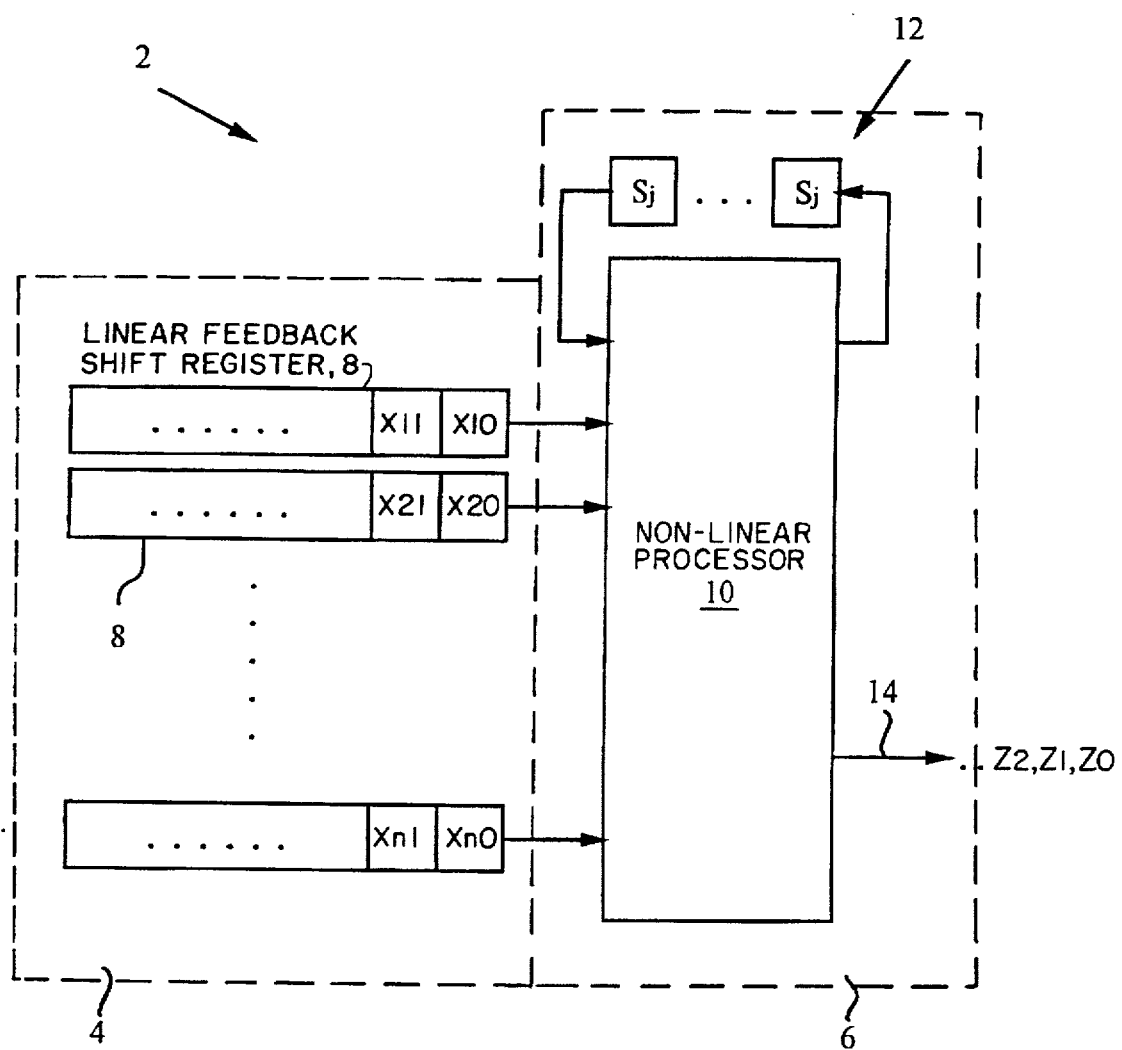
FIG. 1 is a block diagram of a cipher stream generator.

With reference first to FIG. 1, there is shown a cipher stream generator 2 which comprises generally a linear driving subsystem 4 and a non-linear combining subsystem 6. The linear driving subsystem 4 comprises a plurality of n linear feedback shift registers 8, prestored with key data $x_{am}$. Outputs from the LFSR's 8 are received by a non-linear processor 10 of the non-linear combining subsystem 6. The non-linear processor 10 includes a feedback system 12 having memory bits $s_j$. An output 14 from the non-linear combining subsystem 6 produces a data sequence $z_j$ which comprises the cipher stream. The basis of operation of the cipher stream generator 2 is that secret key data $x_{am}$ is provided to the stream cipher 2, which combines the linear pseudo random data sequences produced by LFSR's 8, performs a non-linear transformation thereon, and a cipher stream is output at 14, for combination with a message to be enciphered. The terminal receiving the enciphered message is also provided with a cipher stream generator 2, such that a transformation involving the cipher stream $z_j$ and the enciphered message can be utilised to decipher the message. Equations (1) and (2), below, give a general definition of the functions performed by the non-linear combining subsystem 6.

$$z_j = g(x_{1j}, \ldots, x_{nj}, s_j^1, \ldots, s_j^m) \text{ in GF(2)} \tag{1}$$

$$s_{j+1} = f(x_{1j}, \ldots, x_{nj}, s_j^1, \ldots, s_j^m) \text{ in GF(2)} \tag{2}$$

The bit stream $z_j$, j=0,1,2 ..., is formed by combining the outputs $(x_{1j}, \ldots, x_{aj})$, of LFSR's 8 of lengths $L_1, \ldots, L_n$, respectively. The corresponding connection polynomials of the LFSR's 8 are chosen to be primitive and of relatively prime degrees. The m memory bits $s^1_j, \ldots, s^m_j$ are used to link the jth phase of respective LFSR's 8 with the j+1th phase.

By focussing on a subclass of systems (1) and (2) with one bit of memory and in which g is chosen to be the binary sum of its arguments it can be shown that a system deemed by equations (3) and (4), below, enjoy a number of properties that make an excellent flamework for defining cryptographically sound stream ciphers.

$$z_j = s_j + \sum_{i=1}^{n} x_{ij}, \tag{3}$$

$$s_{j+1} = f(x_{1j}, \ldots, x_{nj}, s_j). \tag{4}$$

Specifically, for suitably chosen functions f this scheme can produce an output stream z with the following properties:

1/ultimately periodic with period a divisor of, but likely to be, P where $$P = (2^{L_1} - 1)(2^{L_2} - 1) \ldots (2^{L_n} - 1), \tag{5}$$

and where $L_i$ is length of LFSR i with output $x_{ij}$.

2/linear complexity likely to be close to P.

If we also assume that $(x_{r0}, x_{r1}, x_{r2}, \ldots)$, $1 <= r, = n$, are independent and uniformly distributed sequences of random variables and that $s_0$ is uniformly distributed then $z_j$ can be shown to have the following properties:

3/statistical balance in that $$\text{prob}(z_j = 0) = \text{prob}(z_j = 1) = \frac{1}{2},$$

4/maximal correlation immunity in that $z_j$ is uncorrelated with any linear form of $x_{1j}, \ldots, x_{nj}$.

Note that the statistical assumptions of independence and uniformity of $(x_{r0}, x_{r1}, x_{r2}, \ldots)$, $1 <= r <= n$, are not strictly compatible with them arising as the output of LFSR's. For example an LFSR of length L is very slightly biased towards 1 producing $2^{L-1}$ 1's and $(2^{L-1}-1)$ 0's. However, the assumptions do appear to be reasonable for the behaviour of LFSR's with numbers of outputs much less than the periods, and provided the corresponding connection polynomials are primitive and of relatively prime degrees.

It is possible to calculate bounds on the linear complexity of the output sequence from (4). This can be done by calculating the likely input memory m from (4) and then converting the feedback system of (3) and (4) into a feed forward structure of input memory m. In principal then an upper bound on the linear complexity may be calculated as a function of the lengths $L_1$ to $L_a$ of LFSR's 8.

The following result provides an upper bound on the number of terms in the initial part of the output sequence before periodic behaviour is exhibited.

Theorem 1. Let equation (4) have the more specific form, $$s_{j+1} = g(x_{1j}, \ldots, x_{nj}) + s_j h(x_{1j}, \ldots, x_{nj}) \text{ in GF(2)} \qquad (4')$$

Then the output sequence $z_j$ defined by (1) and (4') with the first M terms neglected is periodic with period a divisor of P (see (5)) where, $$M = h(L_1, \ldots, L_n).$$

Proof: see appendix.

Note that in general the system defined by (3) and (4) has a period which is difficult to predict with certainty. If however the functions g and h are chosen to avoid degeneracies (such as omitting a variable $x_{ij}$) then the period is very likely to be exactly P.

A specific example of a stream cipher is given by the so called summation combiner, with f defined to be the least significant carry bit of the sum of its arguments in (3) and (4). This may be expressed as, $$z_j = s_j + \sum_{i=1}^{n} x_{ij}, \qquad (6)$$

$$s_{j+1} = \sum_{k \neq 1}^{n} x_{ij} x_{kj} + s_j \sum_{i=1}^{n} x_{ij}. \qquad (7)$$

Calculated linear complexities resulting from the system defined by (6) and (7) are provided in Table 1, below. Each line of the table gives a combination of two or three LFSR's of lengths $L_i$. The corresponding numbers under P refer to the period of the output stream $z_j$. MinComp gives the smallest linear complexity found among all combinations of primitive polynomials of the given lengths. Finally the data under % represents the difference between P and Min Comp as a percentage of P. Note that each register is initialised to be all 1's, and the initial carry $s_0$ is set to 0. It can be seen that the specific system defined by (6) and (7) always has the maximum possible period of P.

TABLE 1

| N | $L_1$ | $L_2$ | $L_3$ | P | MinComp | % |
|---|---|---|---|---|---|---|
| 2 | 2 | 3 | | 21 | 19 | 9.5 |
| | 2 | 5 | | 93 | 92 | 1.1 |
| | 2 | 7 | | 381 | 374 | 1.8 |
| | 3 | 4 | | 105 | 100 | 4.8 |
| | 3 | 5 | | 217 | 208 | 4.1 |
| | 3 | 7 | | 889 | 875 | 1.6 |
| | 4 | 5 | | 465 | 455 | 2.2 |
| | 4 | 7 | | 1905 | 1838 | 3.5 |
| | 5 | 6 | | 1953 | 1886 | 3.5 |
| | 5 | 7 | | 3937 | 3638 | 2.5 |

TABLE 1-continued

| N | $L_1$ | $L_2$ | $L_3$ | P | MinComp | % |
|---|---|---|---|---|---|---|
| | 6 | 7 | | 8001 | 7623 | 4.7 |
| 3 | 2 | 3 | 5 | 651 | 644 | 1.1 |
| | 2 | 3 | 7 | 2667 | 2652 | 0.6 |
| | 2 | 5 | 7 | 11811 | 11353 | 3.9 |
| | 3 | 4 | 5 | 3255 | 3246 | 0.3 |
| | 3 | 4 | 7 | 13335 | 12789 | 4.1 |
| | 3 | 5 | 7 | 27559 | 26819 | 2.7 |

Unfortunately, the carry $s_j$ in such a system suffers from bias. In particular the carry is balanced for N even, and biased for N odd. Thus for example on average for N=3 LFSR's the least significant bit of the carry is 1 with (asymptotic) probability ⅔, while for N=5 the probability is ⅝. Furthermore the carry is biased in runs of equal output digits. Although these bias effects become less significant as N becomes large, they do represent an undesirable feature of the summation combiner. Note however that this bias appears to represent a serious threat to the cryptographic strength of the cipher only in the case of N=2 LFSR's.

Two conditions should be met in the choice of a function f, (refer equation (4)). Firstly it should be highly non-linear so as to provide a cipher stream with a near maximal linear complexity. Secondly it should be balanced when probabilities are conditioned on known output digits.

Specifically function $f_s$ is balanced when probabilities are conditioned on the known output digits $z_j$ provided, $$Pr(s_{j+1} = 1 | z_j = 1) = 1/2,$$
$$Pr(s_{j+1} = 1 | z_j = 0) = 1/2,$$
$$Pr(s_{j+1} = 0 | z_j = 1) = 1/2,$$
$$Pr(s_{j+1} = 0 | z_j = 0) = 1/2,$$

For example consider three memory functions given by, $$f = a_j b_j + a_j c_j + b_j c_j + a_j s_j + b_j s_j + c_j s_j, \qquad (8)$$

$$g = a_j b_j + a_j c_j + b_j c_j + a_j b_j (1+c_j)(1+s_j) + (1+a_j)(1+b_j) c_j s_j, \qquad (9)$$

$$k = a_j b_j + b_j c_j + c_j s_j + (1+a_j)(1+c_j)(1+s_j) + (1+b_j)(1+c_j)(1+s_j). \qquad (10)$$

Note that f (equation (8)) corresponds to the summation combiner of (3) in the case N=3. Table 2, below, shows that f is biased, and that g and k are balanced (both overall and conditionally).

TABLE 2

| $a_j$ | $b_j$ | $c_j$ | $s_j$ | $z_j$ | f | g | k |
|---|---|---|---|---|---|---|---|
| 0 | 0 | 0 | 0 | 0 | 0 | 0 | 0 |
| 0 | 0 | 0 | 1 | 1 | 0 | 0 | 0 |
| 0 | 0 | 1 | 0 | 1 | 0 | 0 | 0 |
| 0 | 1 | 0 | 0 | 1 | 0 | 0 | 1 |
| 1 | 0 | 0 | 0 | 1 | 0 | 0 | 1 |
| 0 | 0 | 1 | 1 | 0 | 1 | 1 | 1 |
| 0 | 1 | 0 | 1 | 0 | 1 | 0 | 0 |
| 0 | 1 | 1 | 0 | 0 | 1 | 1 | 1 |
| 1 | 0 | 0 | 1 | 0 | 1 | 0 | 0 |
| 1 | 0 | 1 | 0 | 0 | 1 | 1 | 0 |
| 1 | 1 | 0 | 0 | 0 | 1 | 0 | 1 |
| 0 | 1 | 1 | 1 | 1 | 1 | 1 | 0 |
| 1 | 0 | 1 | 1 | 1 | 1 | 1 | 1 |
| 1 | 1 | 0 | 1 | 1 | 1 | 1 | 1 |
| 1 | 1 | 1 | 0 | 1 | 1 | 1 | 0 |
| 1 | 1 | 1 | 1 | 0 | 0 | 1 | 1 |

To see that g specifies a balanced function one may check that $z_j$ has a given value of 0 or 1 for eight of the sixteen rows of the table. Furthermore corresponding to each set of these eight rows the value of the column under g is 0 and 1 four times each. The same is true for the function k.

In Table 3, below, linear complexity data is shown for the functions g and k (cf Table 1). The table shows that these functions have close to the maximum period possible (Max) for a range of small primitive connection polynomials. This indicates that memory functions can be found that provide near maximal linear complexity, as well as balance when probabilities are conditioned on known output digits.

TABLE 3

| $L_1$ | $L_2$ | $L_3$ | Max | A(z)-g | %-g | A(z)-k | %-k |
|---|---|---|---|---|---|---|---|
| 2 | 3 | 5 | 651 | 645 | 0.9 | 636 | 2.3 |
| 2 | 3 | 7 | 2667 | 2071 | 22 | 2629 | 1.4 |
| 2 | 5 | 7 | 11811 | 11107 | 5.9 | 11705 | 0.9 |
| 3 | 4 | 5 | 3255 | 3236 | 0.6 | 3241 | 0.4 |
| 3 | 4 | 7 | 13335 | 12563 | 5.8 | 13281 | 0.4 |
| 3 | 5 | 7 | 27559 | 25833 | 6.3 | 27261 | 1.1 |

However, an area of weakness that cipher systems of the form defined by (1) and (2) all share is correlation of the output to linear forms in the $x_{ij}$. Thus although the cipher may be correlation immune in that it has no correlation to certain linear forms, it must have correlations to other linear forms. Such correlations may be exploited to determine the state of the linear form and so weaken the cipher. This is especially so if the LFSR equivalent to the linear form is short or has a connection polynomial with only a few terms.

Specifically it can be shown that if $x_{1j}, x_{2j}, x_{3j}, \ldots$ etc are considered to be independent and uniformly distributed sequences of random variables, then for a memoryless combiner the sum of the squares of the correlation coefficients to certain linear functions of the inputs is always 1. Furthermore, a similar result holds for combiners with one bit of memory. In particular for any cipher defined by (3) and (4), $z_j$ is correlated with random variables of the form $$\sum_{k=j-1}^{j} \sum_{m=1}^{n} w_{mk} x_{mk} \tag{11}$$

except for the cases in which (4) has the special form $$s_{j+1} = f(x_{1j}, \ldots, x_{nj}) + s_j. \tag{12}$$

In the latter, however $z'_j = z_j + z_{j-1}$ is generated by a memoryless combiner and so has correlations to linear forms (11) and in turn to LFSR-sequences. This is an undesirable feature for a cipher stream as knowledge $z_j + z_{j-1}$ allows an attacker to predict $z_j$ from $z_{j-1}$. The following example illustrates a correlation of the summation combiner with a linear function of the inputs.

Example. Consider the three cipher systems defined by (8), (9) and (10). Then from Table 2 it is easy to verify that if a, b and c are assumed to be independent and uniformly distributed sequence of random variables then each systems satisfies, $$\text{Prob}(z_j = a_j + b_j + c_j + a_{j-1}) = \frac{5}{8}.$$

Thus z is correlated with the LFSR that generates $a_j + b_j + c_j + a_{j-1}$.

It has also been shown that correlations exist between linear forms in the input and output sequence for systems with an arbitrary number of memory bits. Thus the use of memory in the combining function can not immunise the cipher from correlations between linear forms in the output sequence and input LFSR's. In view of this result the best that can be hoped for is to design a cipher that systematically and efficiently minimises all correlations to linear forms as well as maintaining properties 1 through 4 discussed hereinbefore.

The preferred embodiment of the invention is based on the system defined by equations (3) and (4), including means to make correlations between linear forms in the output cipher stream $z_j$ and the input terms $x_{ij}$ to $x_{aj}$ uniformly small. In order to achieve this, the preferred embodiment provides a non-linear combining sub-system 6 which may be defined by the following:

$$z_j = m_j + m_{j-1} m_{j-2} + m_{j-3} m_{j-5} + \ldots + \tag{13}$$

$$m_{j-\frac{1}{2}k(k+1)} m_{j-\frac{1}{2}k(k+3)} + s_{j-\frac{1}{2}k(k+3)}$$

$$m_j = \sum_{i=1}^{n} x_{ij}, \tag{14}$$

$$s_{j+1} = f(x_{1j}, \ldots, x_{nj}, s_j). \tag{15}$$

With $(x_{r0}, x_{r1}, x_{r2}, \ldots)$, $1 <= r <= n$, provided from linear driving subsystem 4 as the outputs of n LFSR's 8 with primitive connection polynomials and of relatively prime lengths $L_g$, then for an appropriate non-linear function f, as discussed above the output z is likely to have the following properties:

1/ultimately periodic with period P where $$P = (2^{L_1} - 1)(2^{L_2} - 1) \ldots (2^{L_n} - 1),$$

2/linear complexity close to P.

If $\text{linz}_j$ is given by a linear form in the phases of z, say, $$\text{linz}_j = z_j + \sum_{i=1}^{r-1} w_i z_{j-i} + z_{j-r},$$

and it is assumed that $(x_{r0}, x_{r1}, x_{r2}, \ldots)$, $1 < 32$ $r <= n$, are independent and uniformly distributed sequences of random variables and that $s_0$ is uniformly distributed, then $\text{linz}_j$ has the following properties:

3/statistical balance in that $$\text{prob}(\text{linz}_j = 0) = \text{prob}(\text{linz}_j = 1) = \frac{1}{2},$$

4/maximal correlation immunity in that $\text{linz}_j$ is uncorrelated with any linear form of $x_{1j}, \ldots, x_{nj}$, 5/uniformly small correlations between linear forms in the input and output terms. Specifically if $\text{linx}_j$ is any linear form (11) then, $$\text{prob}(\text{linx}_j = \text{linz}_j) \leq \frac{1}{2} + \frac{1}{2^{k+1}}.$$

A formal mathematical proof of properties 3–5 is given below.

Expand the coefficients of the first terms that appear in each product term of $z_j$ (see (13)) to obtain:

Properties 3 and 4 now follow from the form of the above in which $m_j$ appears 'alone' on the right hand side of the above equation and neither $m_j$ nor any of $x_{1j}, \ldots, x_{nj}$, appear in the rest of the equation.

$$linz_j = z_j + \sum_{l=1}^{t-1} w_l z_{j-l} + z_{j-t}$$

$$= m_j +$$

$$m_{j-1}(m_{j-2} + w_1) +$$

$$m_{j-3}(m_{j-5} + w_1 m_{j-2} + w_2 m_{j-4} + w_3) +$$

$$m_{j-6}(m_{j-9} + w_1 m_{j-4} + w_3 m_{j-8} + w_4 m_{j-5} + w_5 m_{j-7} + w_6) +$$

$$m_{j-10}(m_{j-14} + w_1 m_{j-7} + w_4 m_{j-13} + w_5 m_{j-8} + w_7 m_{j-12} + w_8 m_{j-9} + w_9 m_{j-11} + w_{10}) +$$

$$\cdot$$
$$\cdot$$
$$\cdot$$

$$m_{j-\frac{1}{2}k(k+1)}(m_{j-\frac{1}{2}k(k+3)} + w_1 m_{j-\frac{1}{2}k(k-1)-1} + w_k m_{j-\frac{1}{2}k(k+3)+1} + \ldots + w_{\frac{1}{2}k(k+1)}) +$$

remainder.

Property 5: Consider the equation $linz_j = linx_j$ is an arbitrary linear form (11) in $x_{ij}$. Firstly let $x_{ij}$ be considered fixed (but arbitrary) for $i>1$. Also for simpler notation write simply $x_j$ rather than $x_{1j}$. Introduce new variables $u_1, u_2, \ldots, u_k$ and $v_1, v_2, \ldots, v_k$ as follows, $$u_1 = m_{j-1},$$
$$u_2 = m_{j-3},$$
$$u_3 = m_{j-6},$$
$$\cdot$$
$$\cdot$$
$$\cdot$$
$$u_k = m_{j-\frac{1}{2}k(k+1)},$$
$$v_1 = m_{j-2} + w_1,$$
$$v_2 = m_{j-5} + w_1 m_{j-2} + w_2 m_{j-4} + w_3,$$
$$v_3 = m_{j-9} + w_1 m_{j-4} + w_3 m_{j-8} + w_4 m_{j-5} + w_5 m_{j-7} + w_6,$$
$$\cdot$$
$$\cdot$$
$$\cdot$$
$$v_k = m_{j-\frac{1}{2}k(k+3)} + \ldots + w_{\frac{1}{2}k(k+1)} \text{ (as above)}.$$

Furthermore let $x_i$ be considered fixed for $i$ not equal to one of $j-1, j-3, j-6, \ldots, j-\frac{1}{2}k(k+1)$ or $j-2, j-5, j-9, j-\frac{1}{2}k(k+3)$. Then from the above we have, for certain boolean constants $a_1, a_2, \ldots, a_k$, and $b_1, b_2, \ldots, b_k$. Then each $x_j$ term that has $$u_1 = x_{j-1} + a_1, \qquad v_1 = x_{j-2} + b_1,$$
$$u_2 = x_{j-3} + a_2, \qquad v_2 = x_{j-5} + w_1 k_{j-2} + b_2,$$
$$u_3 = x_{j-6} + a_3, \qquad v_3 = x_{j-9} + w_4 x_{j-5} + b_3,$$
$$\cdot \qquad\qquad\qquad \cdot$$
$$\cdot \qquad\qquad\qquad \cdot$$
$$u_k = x_{j-\frac{1}{2}k(k+1)} + a_k, \quad v_k = x_{j-\frac{1}{2}k(k+3)} + \ldots + b_k.$$

not been fixed can be expressed as a linear form in $u_j$ and $v_j$. For example, $x_{j-2} = v_1 + b_1,$
$x_{j-5} = v_2 + w_1(v_1 + b_1) + b_2 = v_2 + w_1 v_1 + (w_1 b_1 + b_2),$
$x_{j-9} = v_3 + w_4(v_2 + w_1(v_1 + b_1) + b_2) + b_3 = v_3 + w_4 v_2 + w_4 w_1 v_1 + (w_4 w_1 b_1 + w_4 b_2 + b_3),$ etc.

Now from the expansion of $linz_j$ note that the terms $m_{j-1}, m_{j-3}, \ldots, m_{j-\frac{1}{2}k(k+1)}$ appear only as shown. Furthermore the s terms in the remainder all have indices less that $j-\frac{1}{2}k(k+1)$. Thus the equation $linz_j = linx_j$ becomes, after substituting for the m and x terms, $$u_1 v_1 + u_2 v_2 + \ldots + u_k v_k + f(v_1, v_2, \ldots, v_k) = lin(u_1, u_2, \ldots, u_k, v_1, v_2, \ldots, v_k),$$

where $lin()$ is some linear form and where f is some function of $v_1, v_2, \ldots, v_k$. By the standard results on Bent functions (see W. Meier and O. Staffelbach, Correlation properties of Combiners with memory in stream ciphers, *Journal of Cryptology*, Vol. 4, No. 5 (1992), pp. 67–86.) the probability that this equation holds is at most $\frac{1}{2} + \frac{1}{2}^{k+1}$. Since this result holds for every combination of the fixed variables then it must also hold overall.

The speed of cipher stream production of the stream cipher generator 2 may also be improved over the conventional output at a rate of one bit per cycle. If the output is produced at the rate of one word (say 32 bits) per cycle then the speed at which the cipher could be implemented is increased by a factor of 32. In order to achieve this the stream cipher generator 2 may be modified so that each cell variable is a word rather than a bit, such that the operations of addition and multiplication over GF(2) in equations (13), (14) and (15) apply bit-wise between words. The effect is identical to the running of 32 ciphers in parallel and interleaving the outputs together. Thus the nth bit of each output word corresponds to the output of a similar cipher operating a bit at a time. Each of these bit ciphers are identical in structure and differ only in the initial vectors of the LFSR's. By carefully choosing the initial vectors of each LFSR the output can be made to correspond to the output of one full period of a given bit per cycle cipher, the only difference being that the output bits are re-ordered in a straightforward way. The advantage is that the word per cycle cipher can produce the output in $\frac{1}{32}$ of the number of cycles.

In contrast to block ciphers, with stream ciphers there is no established mode of operating that provides integrity. The stream cipher in accordance with the embodiments of the invention, however, can be utilised in the implementation of a message authentication code (MAC) that provides an integrity check value (ICV).

Figure 2:
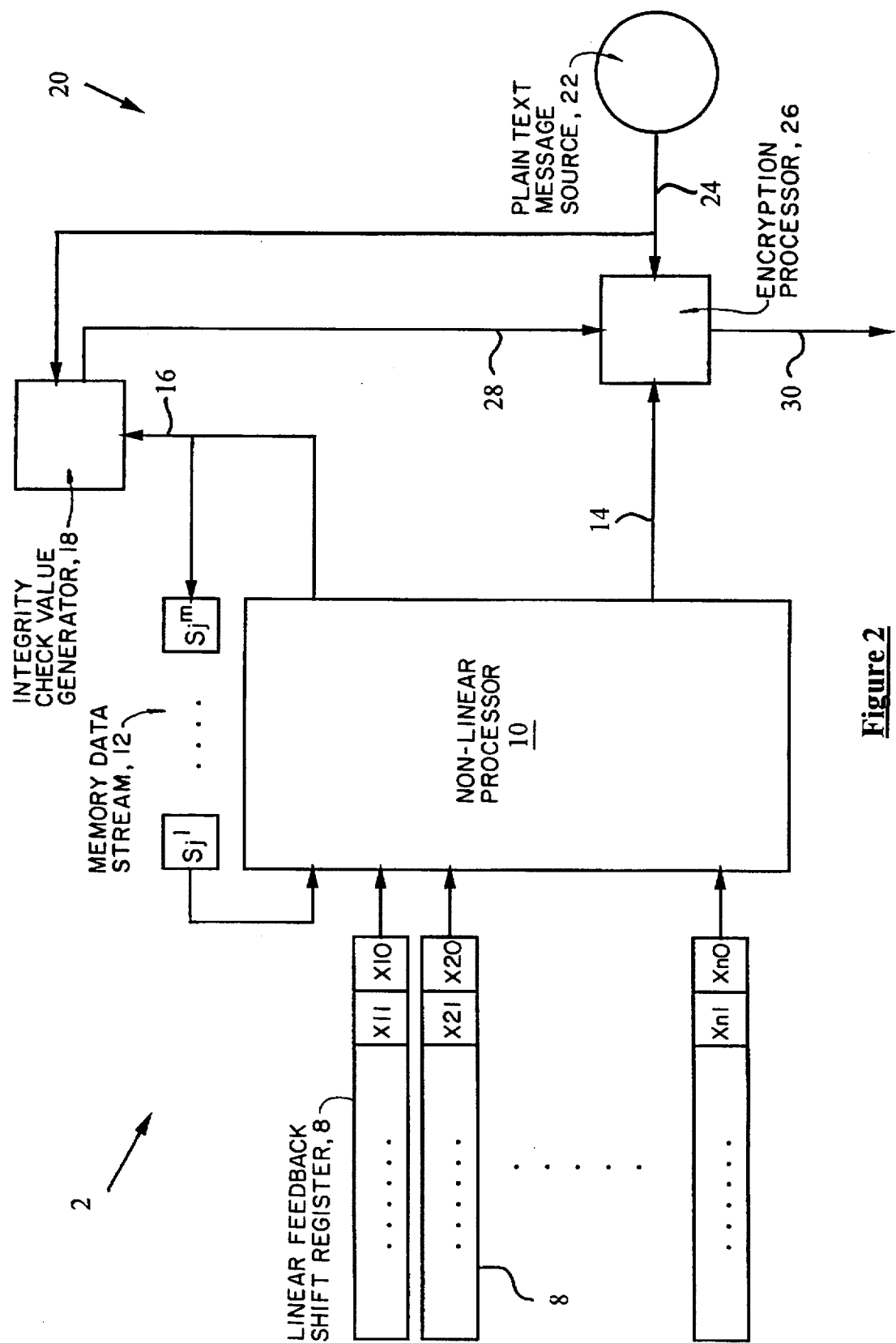
FIG. 2 is a block diagram of an enciphering apparatus in accordance with an embodiment of the invention.

FIG. 2 illustrates a block diagram of a preferred embodiment of the invention which includes a first example of an integrity checking mechanism. In particular, there is shown a message enciphering system 20 which incorporates a cipher stream generator 2 of the type described hereinbefore, and illustrated in FIG. 1. The enciphering system 20 also includes an integrity check value generator 18, an encryption processor 26 and a plain text message source 22. Plain text message data is received from the message source 22 by the integrity check value generator 18 where the message data stream is combined with a memory data stream $s_i$ 16 from the non-linear processor 10. An integrity function is then applied to the combined streams so as to result in an integrity check value (ICV). The ICV is forwarded to the encryption processor 26, whereupon it is appended as a message authentication code onto the end of the plain text message also forwarded to the enciphering processing means 26 from the message source 22. The message and MAC are then enciphered by combination with the cipher stream from output 14, and the enciphered message is output on line 30.

A first example of the integrity and enciphering systems 18 and 26 of FIG. 2 as described hereinbelow.

With the stream cipher 2 implemented as described above, a 32 bit word is produced every cycle. Let a message M consist of k words $M_1, M_2, M_3, \ldots, M_k$. The integrity function is such that the memory bits produced by the cipher $(s_j, s_{j+1}, S_{j+2} \ldots)$ are woven into the integrity function. The steps involved in encrypting and applying integrity to the message M are outlined below, where the symbol "^" refers to bit-wise exclusive or, and "c<<r" refers to the word c cyclically left rotated by r bits. Assume also that the stream cipher has gone through j cycles and so is in state j.

Step 1: If necessary pad the message stream with "zero" words so that it contains at least 16 words. Thus the message stream becomes $M_1, M_2, M_3, \ldots, M_q$ where a >=16.

Step 2: Run the cipher q+1 cycles and store the outputs $z_{j+1}, z_{j+2}, \ldots, z_{j+q+1}$ and memory words $s_{j+1}, s_{j+2} \ldots s_{j+q}$.

Step 3: Add the message stream to the memory stream so that $$M'_n = M_n {}^\wedge s_{j+n} \text{ for } n=1, \ldots, q.$$

Step 4: Pad the new message stream with 32 extra words by repeating the first 16 words twice over. Thus $$M'_{q+16+n} = M'_{q+n} = M'_n \text{ for } n=1, \ldots, 16.$$

Step 5: Define two shift arrays shift1 and shift2 as follows:

```
shift1[i] = i + 1 for i = 0, ..., 30,
shift1[31] = 1.
shift2[i] = (i + 1)*11(mod 32) for i = 0, ..., 30,
shift2[31] = 11.
```

Note that any number between 1 and 30 which is relatively prime to 32 may be chosen rather than 11 in defining shift2.

Step 6: Apply the integrity function in two rounds as follows:

```
a = 0;
b = 0;
c = 0;
d = 0;
icv = 0;
Round 1:
i = 1;
while (i <= q+32) {
    a = d ^ ((M'_i^(b&c)) << shft1[i&31]);
    x[i] = a;
    i = i + 1;
    b = a ^ ((M'_i^(c&d)) << shft1[i&31]);
    x[i] = b;
    i = i + 1;
    c = b ^ ((M'_i^(d&a)) << shft1[i&31]);
    x[i] = c;
    i = i + 1;
    d = c ^ ((M'_i^(a&b)) << shft1[i&31]);
    x[i] = d;
    i = i + 1;
    icv = icv ^d;
}
Round 2:
i = 1;
while (i <= q+32) {
    a = d ^ ((x[i]^M'_i^(b&c)) << shft2[i&31]);
    i = i + 1;
    b = a ^ ((x[i]^M'_i^(c&d)) << shft2[i&31]);
    i = i + 1;
    c = b ^ ((x[i]^M'_i^(d&a)) << shft2[i&31]);
    i = i + 1;
    d = c ^ ((x[i]^M'_i^(a&b)) << shft2[i&31]);
    i = i + 1;
    icv = icv ^d;
}
```

Step 7: Add the icv to the original message M by setting $M_{q+1} = icv$.

Figure 3:
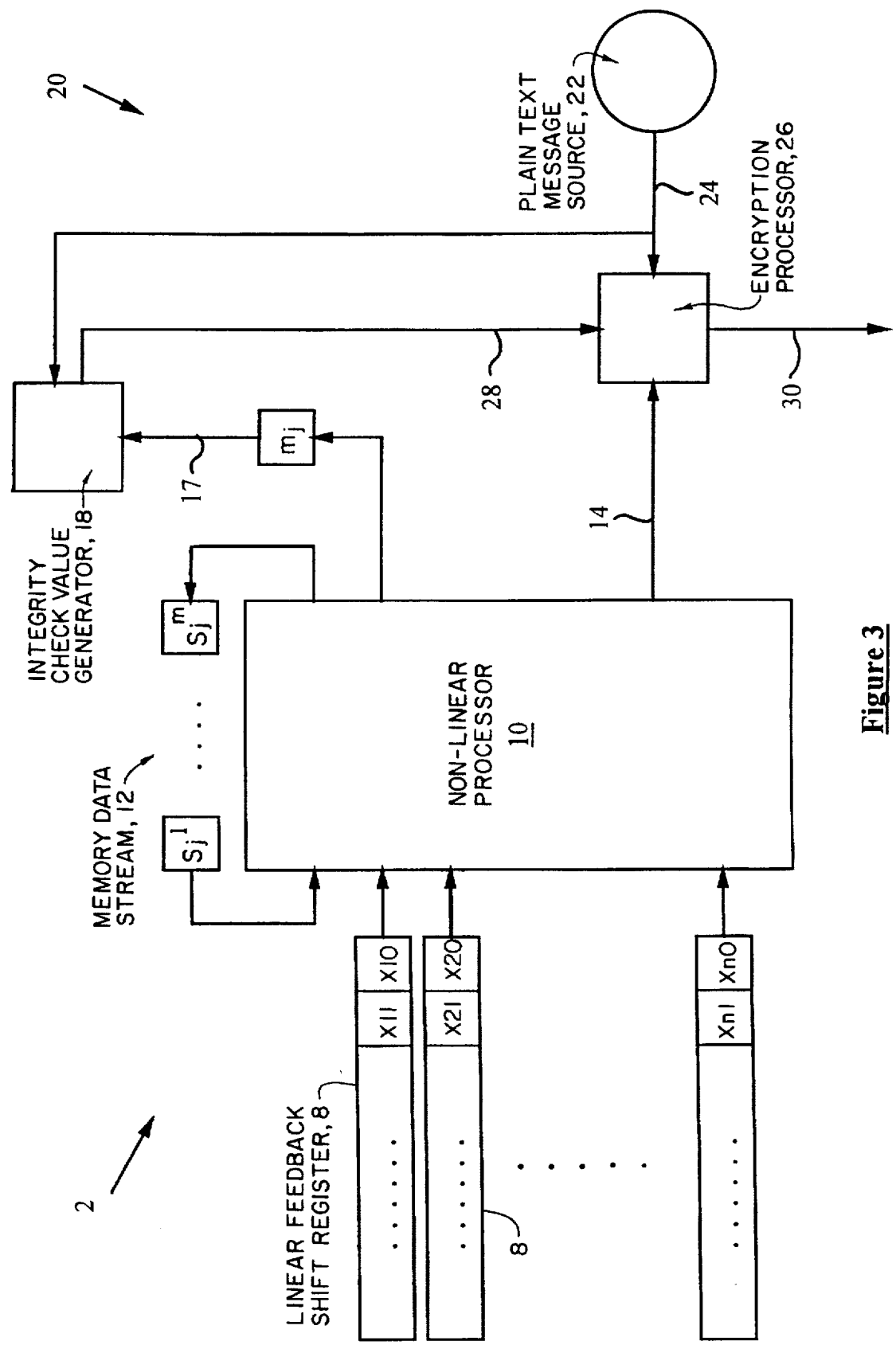
FIG. 3 is a block diagram of a modified form of the apparatus illustrated in FIG. 2.

Step 8: Encrypt the message by adding the cipher stream such that: Encrypt (M)=$M_1 {}^\wedge z_{j+1}, M_2 {}^\wedge z_{j+2}, \ldots, M_{q+1} {}^\wedge z_{j+q+1}$ A modified example of the integrity and enciphering systems 18 and 26 is described in algorithmic form hereinbelow, and illustrated as a block diagram in FIG. 3. In this example the same assumptions made for the purposes of the previous example apply, however instead of the feedback stream $(s_j, s_{j+1}, s_{j+2} \ldots)$ it is memory bits $(m_j, m_{j+1}, m_{j+2} \ldots)$ (see equations (13) and (14)) which are woven into the integrity function.

Step 1: If necessary pad the message stream with zero words so that it contains a multiple of 16 words. Thus the message stream becomes $M_1, M_2, M_3, \ldots, M_n$ where n=16t, t an integer>0.

Step 2: Run the cipher n+1 cycles and store the outputs $z_{j+1}, z_{j+2}, \ldots, z_{j+n+1}$ and memory word stream $m=m_j, m_{j+1}, m_{j+2} \ldots, m_{j+n}$.

Step 3: Add the message stream to the memory stream so that $$M'_r = M_n {}^\wedge m_{j+r} \text{ for } r=1, \ldots, n$$

```
icv = 0;
for (j=0 to t-1) {
    a = 0;
    b = 0;
    c = 0;
    d = 0;
    Round 1:
    i = 1;
    while (i <= 16) {
        a = d^((M'_{16j+i}^(b&c)^(~b&d))<<7);
        i = i + 1;
        b = a^((M'_{16j+i}^(c&d)^(~c&a))<<12);
        i = i + 1;
        c = b^((M'_{16j+i}^(d&a)^(~d&b))<<17);
        i = i + 1;
        d = c^((M'_{16j+i}^(a&b)^(~a&c))<<22);
        i = i + 1;
    }
    Round 2:
    i = 1;
    while (i <= 16) {
        a = d^((M'_{16j+i}^(b&c)^(~b&d))<<5);
        i = i + 1;
        b = a^((M'_{16j+i}^(c&d)^(~c&a))<<9);
        i = i + 1;
        c = b^((M'_{16j+i}^(d&a)^(~d&b))<<14);
        i = i + 1;
        d = c^((M'_{16j+i}^(a&b)^(~a&c))<<20);
        i = i + 1;
    }
    Round 3:
```

-continued

```
i = 1;
while (i <= 16) {
    a = d^((M'_{16j+i}^(b&c)^(~b&d))<<4);
    i = i + 1;
    b = a^((M'_{16j+i}^(c&d)^(~c&a))<<11);
    i = i + 1;
    c = b^((M'_{16j+i}^(d&a)^(~d&b))<<16);
    i = i + 1;
    d = c^((M'_{16j+i}^(a&b)^(~a&c))<<23);
    i = i + 1;
}
icv = icv^d;
}
```

Step 5: Add the icv to the original message M by setting $M_{n+1}=icv$

Step 6: Encrypt the message as $Encrypt(M)=M_1{}^{\wedge}z_{j+1}$, $M_2{}^{\wedge}z_{j+2}, \ldots, M_{n+1}{}^{\wedge}z_{j+n+1}$ If integrity without encryption is required then exactly the same procedure may be used except that in step 6 only $M_{n+1}$ is encrypted. Furthermore, the sequence of numbers (7, 12, 17, 22, 5, ..., 23) which are utilised in the three rounds of step 4 may be chosen at will, however the sequence given has been shown experimentally to produce excellent integrity checking results.

The above described integrity mechanisms are ideal in the sense that for any two messages M and M' the probability that icv (M)=icv (M') for random j (the stream cipher position) is close to ½$^w$ where w is the word size. The so called "Birthday Attack" (where one message is substituted with another message having the same icv) cannot be used against this integrity function as the function changes with the state of the stream cipher. Note that this is not so with a conventional message authentication code.

To highlight the weaknesses of a conventional message authentication code assume that a fixed key k is used with the message authentication code function Mac. An attacker taps in to the communication line between sender S and receiver R. Further assume that the attacker knows the contents of a particular message M. Then if the attacker can obtain the Mac it may be possible to use M and $Mac_k$ (M) to calculate the Mac key k. He may then form his own message M' and $Mac_k$ (M') and send this to R as if it came from the legitimate sender S. Even if the message stream is encrypted with a stream cipher the attacker can mount an attack as follows. After calculating M' and $Mac_k$ (M') the attacker waits until he believes he knows the contents of a subsequent message M". M" is then replaced with M' by adding M"+M' to the message stream and $Mac_k$ (M') to the Mac in the message stream.

However in the present integrity system there are major reasons why the above type of attack cannot work. The length of the key k is at least 512 bits in length while the icv is only 32 bits long. Thus the ability of an attacker to calculate the correct k from M and $Mac_k$ (M) is only about one chance in $2^{480}$ ($>10^{144}$) even if the Mac function is easily reversible. So only a negligible amount of information about k is obtainable from M and $Mac_k$ (M). It may be argued that from M an attacker could calculate $z_j$ and so find $m_j$, however the small level of correlation between $z_j$ and $m_j$ makes such an attack impractical.

Secondly since the Mac key k is constantly changing with the state of the stream cipher an attacker cannot insert a message M and a valid icv at any later stage. Thus even if the attacker obtains M and $Mac_k$ (M) and is able to calculate M' and $Mac_k$ (M') for another message M' then he must do this quickly enough to replace M with M' and $Mac_k$ (M) with $Mac_k$ (M') in the actual transmission stream.

The foregoing detailed description has been put forward merely by way of explanation only, and is not intended to be limiting to the invention defined in the claims appended hereto.

Appendix

Proof of Theorem. In order to simplify the presentation of the proof the following notation is used:

$$sum^j = \sum_{i=1}^{n} x_{ij},$$

$$g^j = g(x_{1j}, \ldots, x_{nj}),$$

$$h^j = h(x_{1j}, \ldots, x_{nj}).$$

By successively substituting from (4') into (3), $$z_j\, sum^j + s_j,$$
$$= sum^j + g^{j-1} + h^{j-1}s_{j-1},$$
$$= sum^j + g^{j-1} + h^{j-1}(g^{j-2} + h^{j-2}s_{j-2}),$$
$$= sum^j + g^{j-1} + h^{j-1}(g^{j-2} + h^{j-2}(g^{j-3} + h^{j-3}s_{j-3})),$$

... etc.

Now since the sequence $h^j$ has a linear complexity of $M=h(L_1, \ldots, L_n)$, then at most M consecutive values of the sequence $h^j$ can be 1. It follows that, $$z_j=sum^j+g^{j-1}+h^{j-1}(g^{j-2}+\ldots+h^{j-M}(g^{j-M-1})\ldots),$$

provided that j is at least M+1. Thus, $$z_j=F(x_{ik},i=1,2,\ldots,n,k=j,j-1,\ldots,j-M-1)$$

for some function F, and for j at least M+1. By the nature of an LFSR any term $x_{ik}$ may be expressed as a function of $x_{im}$, $m=k+1,k+2,\ldots,k+L_i$. Thus, $$z_j=F'(x_{ik},i=1,2,\ldots,n,\,k=j,j-1,\ldots,j-L_i),$$

for some function F, provided that j is at least M+1. Now for j at least M+1 the vector of binary variables in F have the same values with period P. It follows that $z_j$ has period a divisor of P for j at least M+1.//

I claim:

1. A digital data stream generator for generating a cipher stream, said digital data stream generator comprising: a feedback shift register for producing at least one pseudo-random data stream; and a processing structure for producing a cipher stream from said at least one data stream, said processing structure including a means which stores a sequence of combination values derived from a number of preceding values of the at least one data stream, and processing means for producing said cipher stream by multiplying pairs of said combination values to generate multiplied pairs and summing said multiplied pairs, wherein the difference in sequence position between the combination values for each pair is different.

2. A digital data stream generator as claimed in claim 1 wherein the processing structure includes a non-linear feedback system for producing a sequence of memory values from values of said at least one data stream and at least one previous memory value, said at least one memory value being summed with said multiplied pairs to produce said cipher stream.

3. A digital data stream generator as claimed in claim 1 wherein the feedback shift register structure comprises a plurality of linear feedback shift registers each of which pass a pseudo-random data stream to a non-linear combining structure.

4. A digital data stream generator as claimed in claim 2 wherein the non-linear feedback system generates a memory value by applying a non-linear function to values of the at least one data stream and at least one previous memory value.

5. A digital dam stream generator as claimed in claim 4 wherein each of said combination values is derived by summing values from the at least one data stream.

6. A digital data stream generator as claimed in claim 5 wherein the feedback shift register structure comprises n linear feedback shift registers which produce bit streams $x_{1j}$, ... $x_{nj}$, and wherein said feedback system produces a sequence of memory bits $s_j$ according to $s_{j+1}=f(x_{1j}, \ldots, x_{nj}, s_j)$ where f is a non-linear function.

7. A digital data stream generator as claimed in claim 6 wherein said combination values $m_j$ are produced according to $$m_j = \sum_{i=1}^{n} x_{ij}.$$

8. A digital data stream generator as claimed in claim 7 wherein the cipher system stream $z_j$ is generated according to $$z_j = m_j + \sum_{n=1}^{k} [m_{j-\frac{1}{2}(k)n((k)n+1)} m_{j-\frac{1}{2}(k)n((k)n+3)}] + s_{j-\frac{1}{2}(k)n((k)n+3)}$$

where k is an integer greater than one.

9. A digital data stream generator for generating a cipher stream said digital data stream generator comprising: at least one linear feedback shift register (LFSR); a summing means for producing a sequence of sums of the outputs of said at least one LFSR; a non-linear feedback processing means for producing a sequence of non-linear values in accordance with the outputs of said at least one LFSR and at least one previous value of said non-linear output value sequence; and an output processing means for generating a data stream in accordance with a Bent function utilizing a plurality of pairs of said sequence of sums and at least one of said sequence of non-linear values, wherein the difference in the sequence position of the members of each pair is different as between each pair.

10. A system for encrypting or decrypting a digital message, said system comprising: a linear driving sub-system for generating a pseudo random data sequence; a non-linear feedback sub-system for producing a cipher stream from said pseudo random data sequence; and an encryption processor for encrypting or decrypting a message by combining it with said cipher stream, the non-linear feedback system including a non-linear feedback processing means for generating a feedback sequence by applying a non-linear function to at least one value from said pseudo-random data sequence and at least one previous value of the feedback sequence, and a cipher stream generating means for generating said cipher stream by summing products of pairs of values of said pseudo random data sequence together with a value from said feedback sequence, the pairs of values being chosen such that the difference in sequence position as between each member of a pair of values is different as between each pair.

11. A system as claimed in claim 10 wherein the linear driving sub-system comprises a plurality of linear feedback skirt registers which are prestored with secret key data and which generate separate data sequences which are combined to provide said pseudo random data sequence.

12. A system as claimed in claim 11 wherein said non-linear feedback processing means in use generates said feedback sequence by applying said non-linear function to values from said separate data sequences together with a previous value of the feedback sequence.

13. A system as claimed in claim 12 wherein said encryption processor encrypts a plain text message stream by performing a bit-wise exclusive-or operation on the message stream with said cipher stream.

14. A system as claimed in claim 12 wherein said encryption processor decrypts an encrypted message stream by performing a bit-wise exclusive-or operation on the encrypted message stream with said cipher stream.

15. A system as claimed in any one of claims 10 to 14 further comprising an integrity checking subsystem for generating an integrity check value from a plain text message by combining values from said feedback sequence with the message stream and applying an integrity function thereto.

16. A method for generating a cipher stream, said method comprising the steps of: generating a pseudo random data stream sequence, and generating a cipher stream by summing products of pairs of values of said data stream sequence with a value derived from a non-linear feedback function of values from the data stream sequence, the pairs of values being chosen such that the difference in sequence position as between each member of a pair is different as between each pair.

17. A method according to claim 16 wherein the pseudo random data stream sequence is generated by summing separate data sequence outputs from a plurality of linear feedback shift registers.

18. A method according to claim 17 wherein said non-linear feedback function operates on values from said separate data sequence outputs.

19. A method according to claim 18 wherein the output values of said separate data sequences are words, such that the summing and multiplication operations are applied bit-wise between words.

20. A method according to claim 18 wherein said pseudo random data sequence $m_j$ is produced from n said separate data sequence outputs $x_{ij}$ according to $$m_j = \sum_{i[\neq]=1}^{n} x_{ij}$$

and wherein the cipher stream $z_j$ is generated according to $$z_j = m_j + \sum_{n=1}^{k} m_{j-\frac{1}{2}(k)n((k)n+1)} m_{j-\frac{1}{2}(k)n((k)n+3)} + s_{j-\frac{1}{2}(k)n((k)n+3)}.$$

21. A method according to any one of claims 16 to 20, including the step of applying the cipher stream to a plain text message stream to generate an encrypted message stream.

22. A method according to any one of claims 16 to 20 including the step of applying the cipher stream to an encrypted message stream to obtain a decrypted plain text message stream.

23. A method according to claim 21 including the step of combining values derived from said non-linear feedback function with the plain text message stream and applying an integrity function thereto so as to obtain an integrity check value.

24. A method according to claim 23 including the step of appending the integrity check value to the plain text message stream before applying the cipher stream thereto.

25. A method according to claim 22 including the step of combining values derived from said non-linear feedback function with the decrypted plain text message stream and applying an integrity function thereto so as to obtain an integrity check value.

26. A method according to claim 25 including the step of comparing the integrity check value obtained from the plain text message stream with a value appended thereto so as to determine the integrity of the decrypted plain text message.

27. A method of encrypting a digital message, said method comprising the steps of: generating a pseudo random data stream sequence; performing a non-linear feedback transformation on said data stream sequence; generating a cipher stream in which correlations to linear forms are minimized by summing products of pairs of values of said data stream sequence with a value of said non-linear feedback transformation, the pairs of values being chosen such that the difference in sequence position as between each member of a pair is different as between each pair; and encrypting the digital message on the basis of said cipher stream.

28. A method of decrypting an encrypted digital message, said method comprising the steps of: generating a pseudo random data stream sequence; performing a non-linear feedback transformation on said data stream sequence; generating a cipher stream in which correlations to linear forms are minimized by summing products of pairs of values of said data stream sequence with a function based on a value of said non-linear feedback transformation, the pairs of values being chosen such that the difference in sequence position as between each member of a pair is different as between each pair; and decrypting the digital message on the basis of said cipher stream.

29. A method according to claim 27 or 28 wherein said pseudo random data stream sequence is produced by a combination of outputs from a plurality of linear feedback shift registers.

30. A method according to claim 27 wherein values derived from said non-linear feedback transformation are combined with the digital message, and an integrity function applied to the combination to produce an integrity check value which is appended to the digital message before encryption thereof.

31. A method according to claim 27 wherein values of said pseudo random data stream sequence are combined with the digital message, and an integrity function applied to the combination to produce an integrity check value which is appended to the digital message before encryption thereof.

32. A method of generating a cipher stream utilizing a digital processing apparatus, said method comprising the steps of: generating a pseudo random number stream sequence $m_j$; generating a number stream sequence $s_j$ in accordance with a non-linear feedback scheme; and generating an output cipher stream sequence $z_j$ according to:

$$z_j = \sum_{k=c}^{d} m_{a_k} m_{b_k} + s_d$$

where c and d are predetermined integers with $c<d \leq j$ and $a_k$ and $b_k$ are integers less than or equal to j such that $(a_e-b_e) \neq (a_f-b_f)$ for all e and f in the closed interval.

33. A stream cipher comprising a linear driving system which in use generates at least one pseudo-random data stream, a non-linear combining system including a feedback data stream, which generates a cipher stream by performing a non-linear operation on said at least one pseudo-random data stream, an integrity system which in use combines a digital message with said feed-back data stream and applies an integrity function thereto so as to generate an integrity check value, and an output system wherein the integrity check value is appended to said digital message and the message and appended check value is enciphered by use of said cipher stream.

* * * * *